United States Patent
Madachy et al.

(10) Patent No.: US 7,861,382 B1
(45) Date of Patent: Jan. 4, 2011

(54) CARGO TIGHTENER AND STRAP COLLECTOR WITH IMPROVED RELEASE MECHANISM

(75) Inventors: Frank Joseph Madachy, Genoa, OH (US); John Scott Yoder, Holland, OH (US)

(73) Assignee: Ratchet Enterprises, LLC, Sylvania, OH (US)

( * ) Notice: Subject to any disclaimer, the term of this patent is extended or adjusted under 35 U.S.C. 154(b) by 357 days.

(21) Appl. No.: 11/942,180

(22) Filed: Nov. 19, 2007

Related U.S. Application Data

(63) Continuation-in-part of application No. 11/818,841, filed on Jun. 15, 2007, now abandoned, which is a continuation-in-part of application No. 11/668,009, filed on Jan. 29, 2007, now abandoned, which is a continuation-in-part of application No. 11/227,313, filed on Sep. 15, 2005, now Pat. No. 7,296,326.

(51) Int. Cl.
*B25B 25/00* (2006.01)
*B66D 1/00* (2006.01)

(52) U.S. Cl. ............... 24/68 CD; 24/68 R; 254/218; 410/100

(58) Field of Classification Search .......... 24/68 CD, 24/68 R; 254/218; 410/100
See application file for complete search history.

(56) References Cited

U.S. PATENT DOCUMENTS

| | | | |
|---|---|---|---|
| 4,622,721 A | 11/1986 | Smetz et al. | |
| 5,611,520 A * | 3/1997 | Soderstrom | 254/218 |
| 6,102,371 A * | 8/2000 | Wyers | 254/218 |
| 6,609,275 B1 | 8/2003 | Lin | |
| 6,796,758 B2 | 9/2004 | Coslovi et al. | |
| 7,100,902 B1 * | 9/2006 | Lu | 254/218 |
| 7,350,767 B2 * | 4/2008 | Huang | 254/218 |
| 2004/0094650 A1 * | 5/2004 | Huang | 242/385.4 |
| 2009/0100653 A1 * | 4/2009 | Wang | 24/68 CD |

FOREIGN PATENT DOCUMENTS

| DE | 3639712 A1 | 6/1988 |
|---|---|---|
| WO | WO93/18937 | 9/1993 |

OTHER PUBLICATIONS

Online Catalog; www.Tarps4Less.com.

* cited by examiner

*Primary Examiner* — Robert J Sandy
*Assistant Examiner* — Michael Lee
(74) *Attorney, Agent, or Firm* — Marshall & Melhorn, LLC

(57) ABSTRACT

A cargo tightener and strap collector is shown having a rotatable shaft provided on the lever portion of the cargo tightener and strap collector. A slot is provided in the shaft so that the free end of a strap may be inserted in the slot and wound on the shaft to secure the strap and prevent its fluttering in the wind or trailing on the ground while in use. The rotatable shaft provided on the lever portion of the cargo tightener and strap collector is made to have a cross-section or shape, at least proximate one end, to mate or interfere with a recess in at least one of the sidewalls on the lever portion when a second rotation means urges the sidewalls together. There is thus provided positive locking of the wound strap.

14 Claims, 12 Drawing Sheets

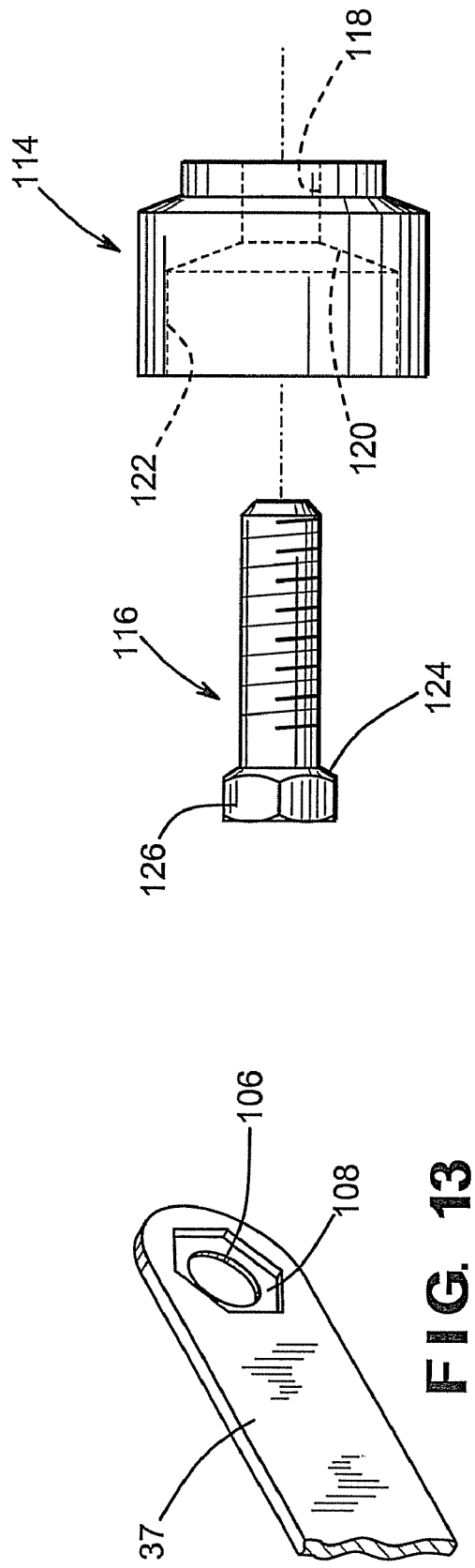
FIG. 14
FIG. 13
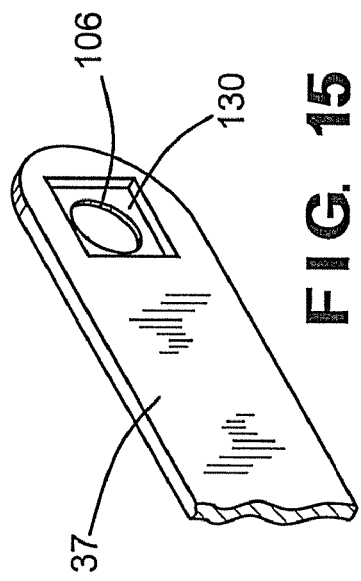
FIG. 15

US 7,861,382 B1

CARGO TIGHTENER AND STRAP COLLECTOR WITH IMPROVED RELEASE MECHANISM

CROSS-REFERENCE TO RELATED APPLICATIONS

The present application is a continuation-in-part of U.S. Letters patent application Ser. No. 11/818,841, filed on Jun. 15, 2007 now abandoned, which is a continuation-in-part of U.S. Letters patent application Ser. No. 11/668,009, filed on Jan. 29, 2007 now abandoned, which is a continuation-in-part of U.S. Letters patent application Ser. No. 11/227,313, filed on Sep. 15, 2005 now U.S. Pat. No. 7,296,326, for Cargo Tightener and Strap Collector. application Ser. Nos. 11/818, 841, 11/668,009 and 11/227,313 are pending as of the filing date of the present application. These three applications are specifically incorporated herein in their entireties, and priority to each is claimed.

BACKGROUND OF THE INVENTION

The present invention relates to a device for collection and storage of the free, non-active, portion of a strap of a manually operated cargo tightener which is used to secure cargo to be transported.

The typical prior art cargo tightener, which is modified to make the present invention, includes a shaft provided at one end of a connecting link or arm. The shaft is journaled in one end of the connecting arm, thus providing for rotatable attachment of a lever to the connecting arm. A first, or short, strap is firmly secured to a bolt or pin in the other end of the connecting arm, and has at its free end, a hook or other device for attachment to a vehicle transporting the cargo.

A second strap has a hook or other device at one of its ends. The hook is attached to the transportation vehicle. The other end, or free or non-active end, of the second strap is inserted through a slot in the rotatable shaft. A ratchet arrangement permits tightening of the strap by back and forth movement of the lever with respect to the connecting link. Because the connecting arm or link is held firmly in place by the first strap, the second strap tightens down over the cargo. The cargo tightener is conventional and, therefore, will not be described in any great detail except with regard to the modification of the lever to provide the strap collector portion of the present invention.

A common problem when using the above mentioned cargo tightener with tensioning straps concerns the handling of the free end of the strap not used when securing the cargo. This strap portion has to be thoroughly secured to the cargo in order not to flutter in the encountering wind, or to trail on the ground, both cases leading to a hasty soiling and wearing down of the strap. Further, a freely fluttering strap is a danger to traffic, particularly in connection with the 24 to 30 foot long straps used professionally by haulage contractors. Such a fluttering strap may injure nearby pedestrians when a cargo hauler passes by. Further, the trailing strap may get caught in the wheels if the cargo hauler is a truck. When this happens, the strap may wind around one or more wheels and put such a load on the prior art cargo tightener to cause it to break and release any load it may be tightened around. Thus, prior art cargo tighteners left many safety issues unresolved.

Many attempts to solve these problems are known in the prior art. US Patent Publication No. US 2004/0094650 A1 to Huang, shows a strap fastener system including a strap fastener for fastening a belt, and a winding device for winding the strap. The winding device includes a housing which is attached to a connecting arm portion of the typical prior art cargo tightener. A reel is put in the housing for winding the strap, and a torque spring is arranged between the reel and the control device for automatically rotating the reel in the non-rotational position of the control device.

U.S. Pat. No. 5,611,520 to Soderstrom, shows a strap collector which is designed to be attached to the connecting arm of a standard cargo tightener. The strap collector includes a magazine for the protection and storage of the long tensioning strap of the cargo tightener when wound to the shaft of the strap collector.

U.S. Pat. No. 6,609,275 B1 to Lin, shows a strap tightener with an auto pulling device connected to a seat. The auto pulling device includes a housing and a reversing device. The reversing device is rotatably received in the housing. The housing would correspond to a connecting arm portion of a prior art cargo tightener.

U.S. Pat. No. 6,102,371 to Wyers, shows a strap tensioning and collection device having a variable length strap and a fixed length strap operatively associated with the strap storage section, and a strap tensioning section.

U.S. Pat. No. 4,622,721 to Smetz, et al. shows a device for connecting components to a belt.

German Offenlegungsschrift DE 36 39 712 A1 to Kinnert, shows a tensioning ratchet, in particular for belts, which is equipped with a ratchet body having a retaining bolt for fastening a safety belt, and having a ratchet lever which is mounted at the other end of the ratchet body so as to be rotatable about the axle of a slotted roller for fastening the end of a tensioning belt to be wound thereon.

All of the above devices perform generally satisfactorily but, in addition to the above-mentioned problems with a fluttering strap, share the aforementioned problem with the strap, as well as the problem of relatively high costs and difficulty of manufacture. In addition, they are rather bulky. Thus, those skilled in the art continued their search for a better cargo tightener and strap collector.

SUMMARY OF THE INVENTION

The aim of the present invention is to provide a cargo tightener and strap collector which is more cost effective compared with prior art devices, is less bulky, and is easier to manufacture. This is accomplished by having the strap collector on the lever portion of the cargo tightener, rather than on the connecting arm segment, as in the prior art. The advantages of this will become apparent by a careful reading of the detailed description, with appropriate reference to the accompanying drawings, wherein like numerals designate like parts in the several views.

BRIEF DESCRIPTION OF THE DRAWINGS

The invention is to be described in more detail below using exemplary embodiments.

FIG. 13 is an enlarged perspective view, partially cut-away, of a portion of the construction shown in FIG. 12, illustrating a non-circular recess.

FIG. 14 is an enlarged exploded view of an alternate embodiment of the left hand knob and threaded fastener of the invention.

FIG. 15 is a view, similar in part to FIG. 13, but showing a different non-circular recess.

DETAILED DESCRIPTION OF THE INVENTION

Figure 1:
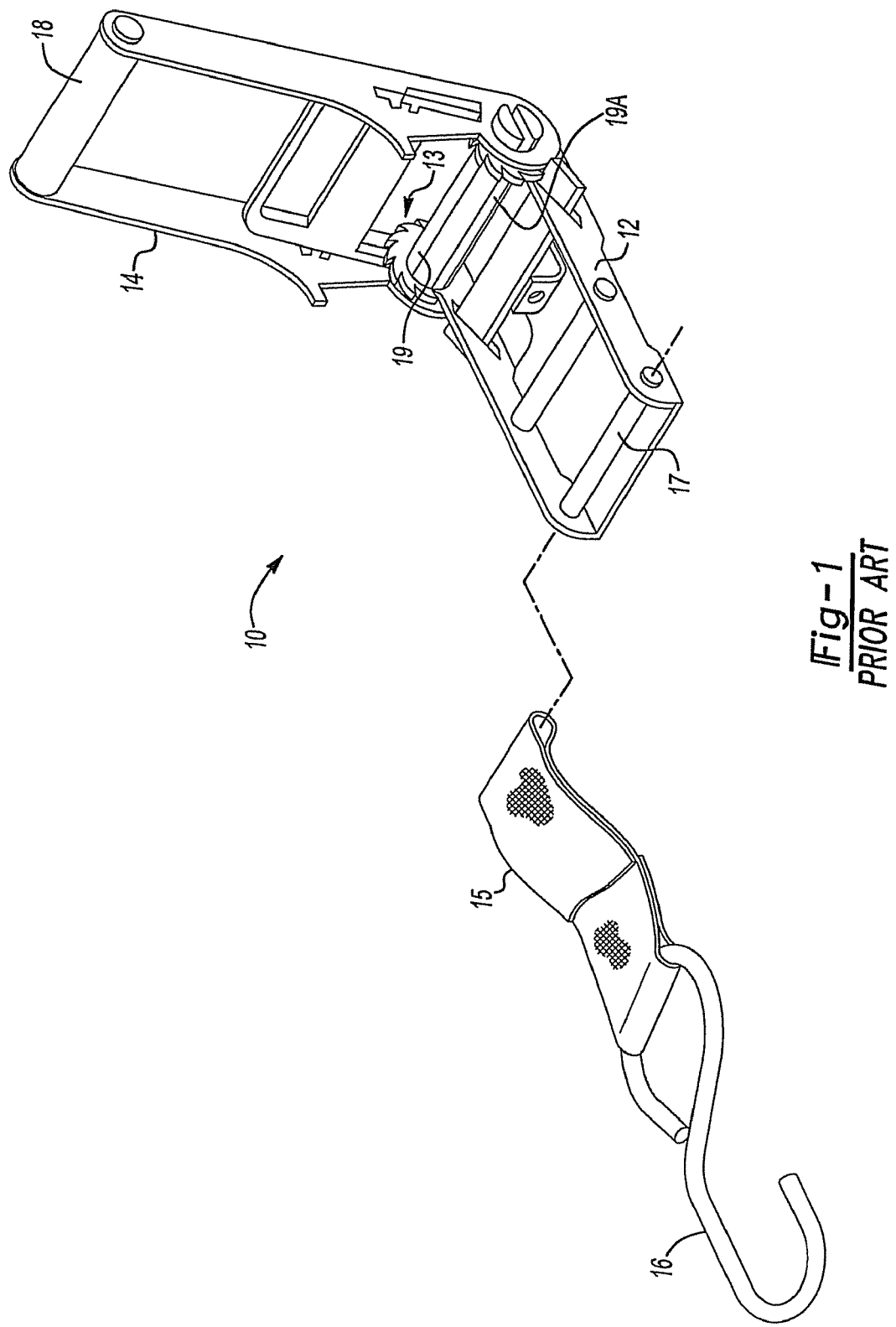
FIG. 1 is a perspective view of a prior art cargo tightener.

Referring to FIG. 1, there is shown a prior art cargo tightener and strap collector, generally designated by the numeral 10. The cargo tightener and strap collector 10 comprises a connecting arm or link 12, and a lever or arm 14. A strap 15 is provided with a hook 16 at one end thereof for connection to a transportation vehicle (not shown). The other end of strap 15 is firmly held to connecting arm 12 by pin 17. Reciprocal motion of lever 14 using handle 18 will cause shaft 19 to rotate due to the ratchet and pawl assembly 13.

Figure 2:
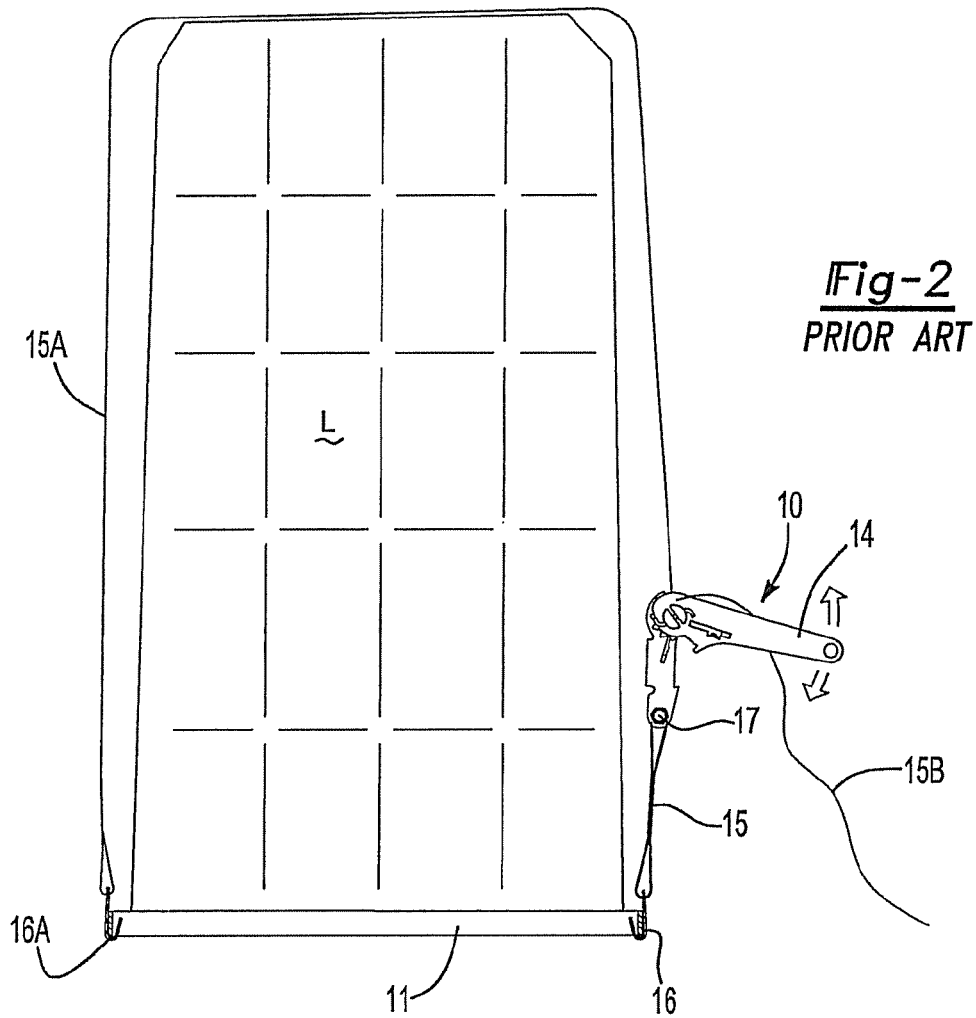
FIG. 2 is an end elevational view of a cargo loaded on a platform showing how the prior art cargo tightener of FIG. 1 is fastened to hold a load in position, and illustrating the free end or tail of the ratchet strap that is left to be dealt with after the cargo tightener is tightened to the desired extent.

With reference to FIG. 2, there is shown the prior art cargo tightener and strap collector 10 in a typical use situation, attached to a cargo platform 11, usually of a movable type, and tightened about a load L to secure or tighten it in position. While the cargo platform is usually of the movable type, such as a trailer which may be pulled by a truck or tractor, cargo tightener and strap collector 10 may also be used to secure stationary loads.

While strap 15 causes no problem in the art, as when tightened on the load L, it is always held taught by virtue of the hook 16 and the pin 17 when under tension, the same is not true of second strap 15A. Second strap 15A has at one end a second hook 16A attached to cargo platform 11. The other end of second strap 15A is threaded through an opening or slot 19A in shaft 19, which is caused to rotate by reciprocal motion of lever 14 using handle 18. This will cause shaft 19 to rotate due to the ratchet and pawl assembly 13. While a portion of second strap 15A intermediate its' ends will wind around shaft 19, a large portion or tail 15B will remain loose, and must be secured for safe transit of load L.

The securing of ratchet strap tail 15B is a serious problem in the art as there is no readily available and cost effective place to store it. Usually the person placing the load L on platform 11 will simply wind the tail 15B around a portion of second strap 15A. Many times the tail 15B will be tied in a loose knot around the second strap 15A. No matter what solution is tried, the tail 15B frequently becomes loose during transit of the load L and flaps in the breeze as the load L is transported down the road, causing a hazard to surrounding drivers and pedestrians. Since many cargo tighteners are usually needed to secure load L to platform 11, many tails 15B may be causing a hazard at the same time.

Figure 3:
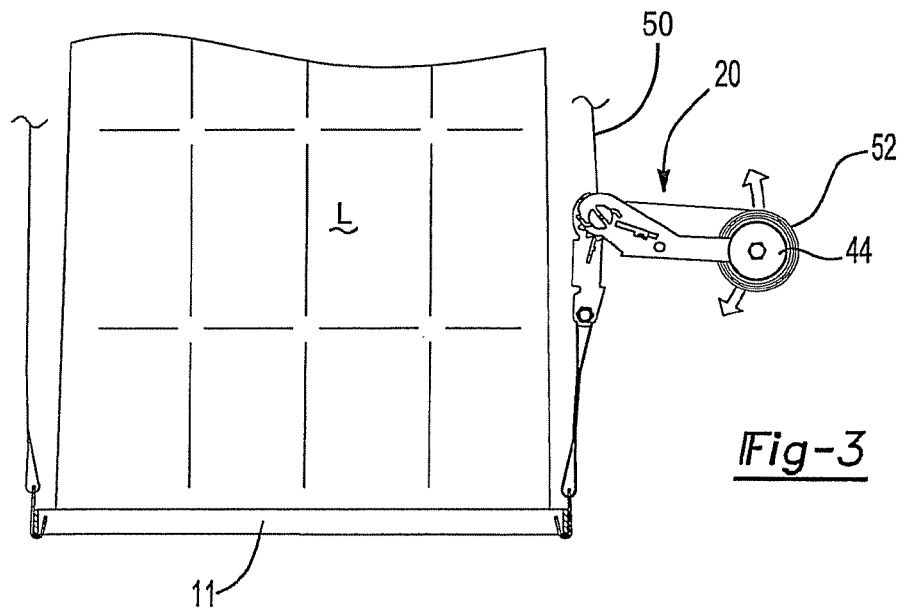
FIG. 3 is a view similar in part to FIG. 2, but illustrating the use of a construction embodying the present invention, and showing how the problem of the ratchet strap tail is solved by the present invention.

Referring to FIG. 3, the present invention relates to a modification of the prior art lever or arm 14 to solve the problems of the prior art. For purposes of understanding, new reference numerals are used when referring to the present invention. It can be seen that the improved cargo tightener and strap collector 20 now provides for storage of the strap, now referred to by the numeral 50, on the arm or lever 24. There is provided a ready and secure place for storage of the tail 50A in the form of roll 52, eliminating the problems of the prior art in a manner to be fully described hereinafter.

Figure 4:
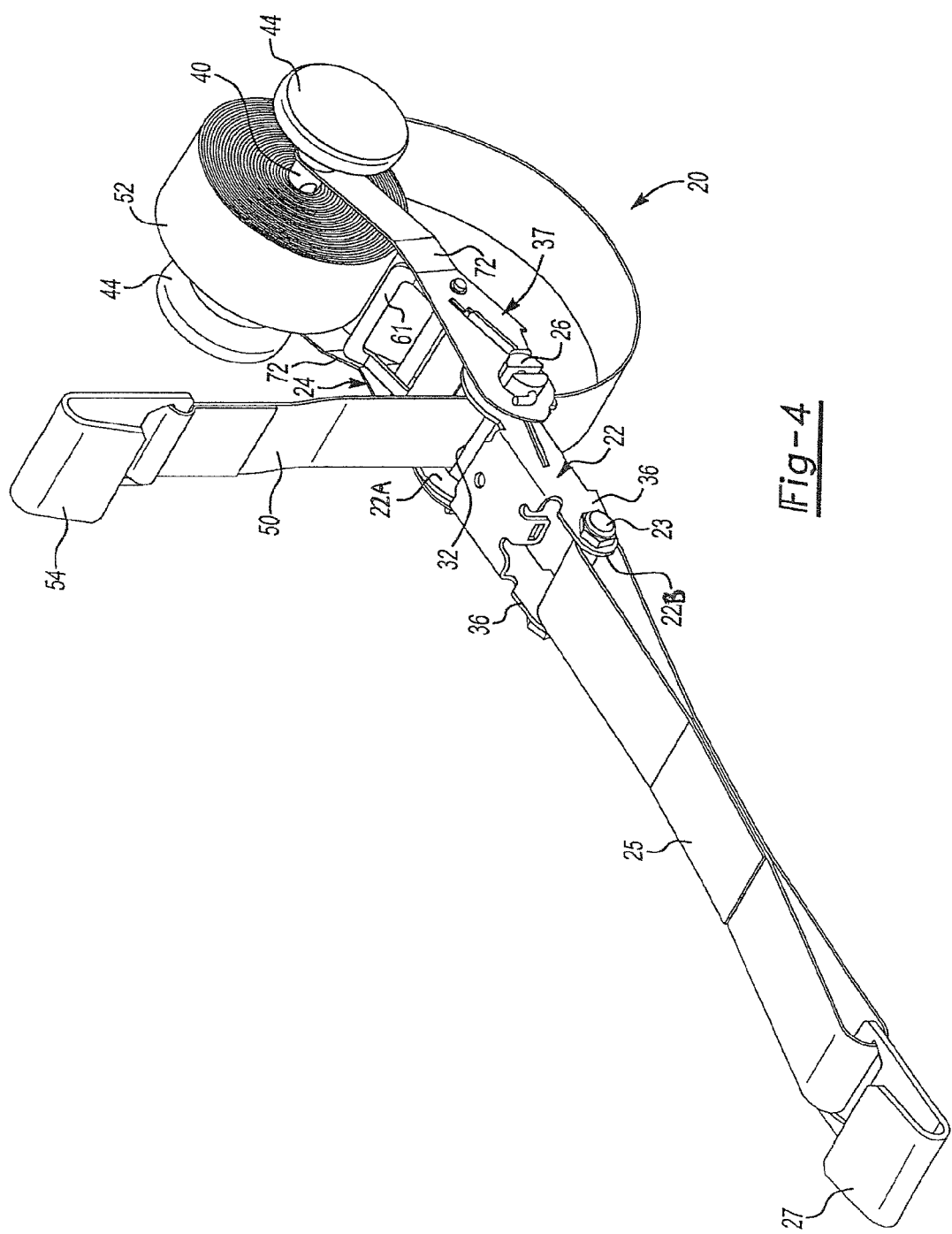
FIG. 4 is a perspective view of a construction embodying the present invention with the cargo straps attached.
Figure 5:
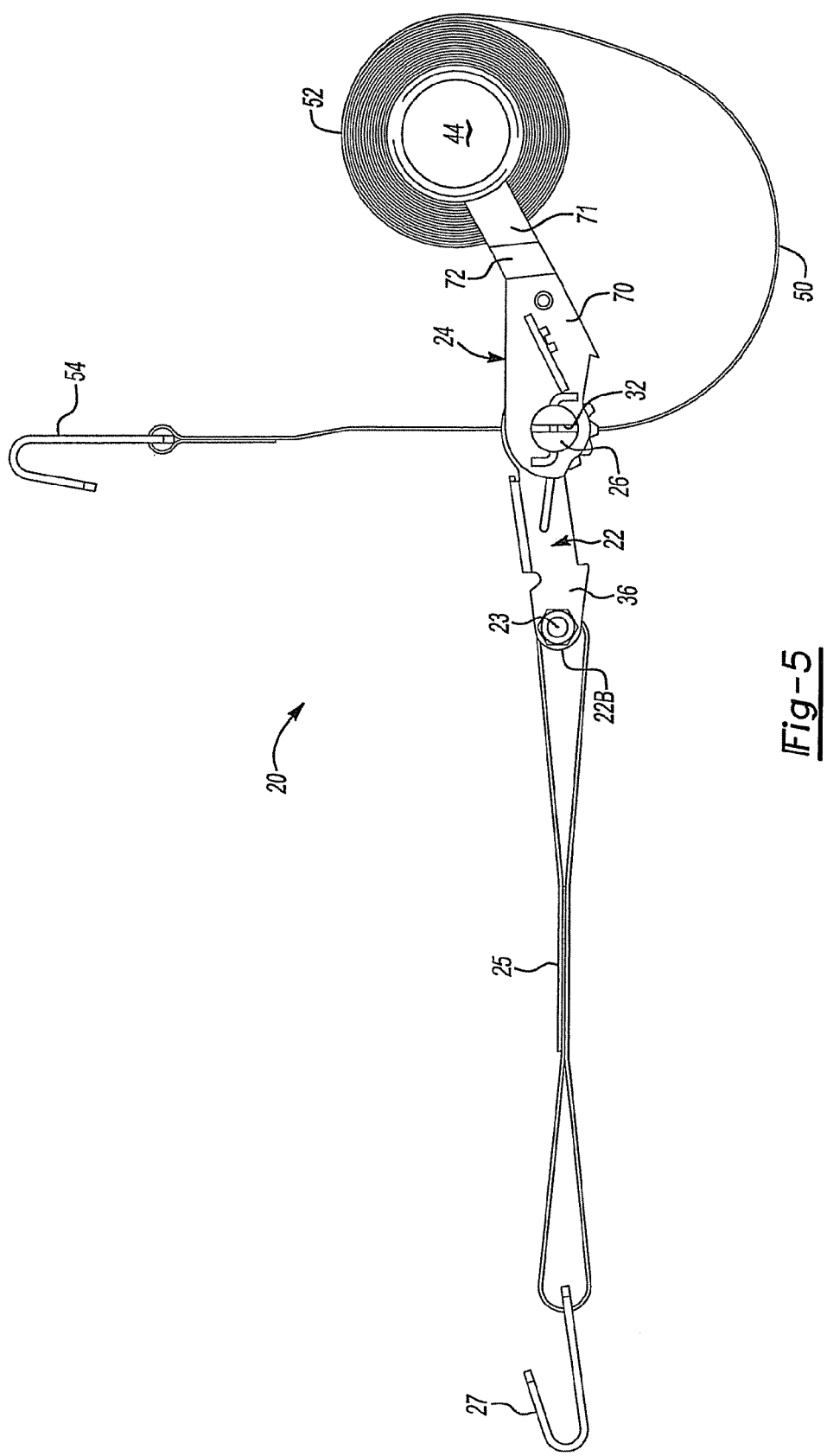
FIG. 5 is an elevational view of the construction of FIG. 4 in its open position.
Figure 6:
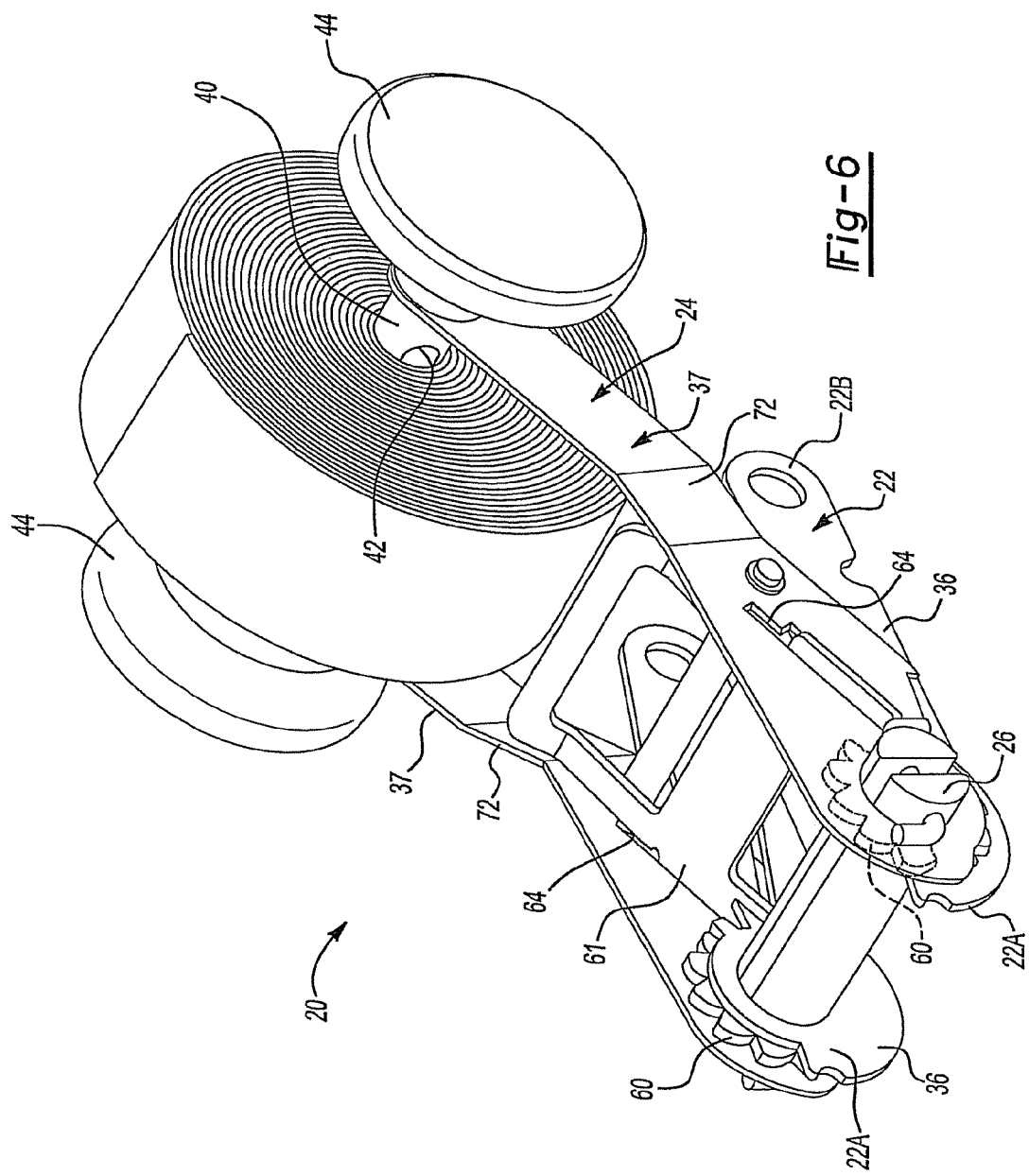
FIG. 6 is a perspective view of the construction of FIG. 4 in its closed position, with one of the ratchet straps removed for clarity.

Referring now to FIGS. 4-6, the present invention relates to an improved cargo tightener and strap collector, generally designated by the numeral 20. An improved apparatus for tightening and collecting a strap, or strap collector, or combination cargo tightener and strap collector 20, includes a connecting arm or link 22 and a lever 24. Connecting arm 22 extends in a longitudinal direction, and may be substantially similar to the connecting arm 12 shown in the prior art construction of FIG. 1. It is a modification to the lever of the prior art construction, identified by the numeral 24, which provides a novel cargo tightener and strap collector 20. As with the prior art, there is provided a first shaft 26 journaled for rotation in one, or first, end 22A of the connecting arm 22. At the other, or second, end 22B of the connecting arm 22 is provided a pin 23, to which a first, or short, strap 25 is attached. A first hook or fastening means or fastening device 27 is attached to the other end of the strap 25. In use, the hook 27 will be attached to the transportation vehicle on which the cargo being tightened is being transported.

As in the prior art devices, reciprocal rotation of the lever 24 will cause co-rotation of the first shaft 26. Journals for first shaft 26, as well as second shaft 40, are provided by opposed apertures provided in a first pair of spaced apart sidewalls 36 provided in connecting arm 22, and a second pair of spaced apart sidewalls 37 in the lever 24. A second shaft 40 has provided therein second slot 42 (FIG. 6) to accept a free end, i.e., the end without the second hook 54, of a second belt 50, as hereinafter described.

At least a first portion 40A of shaft 40 may extend beyond at least one of the second pair of sidewalls 37 (FIG. 4) so that a knob 44 may be attached thereto for rotation of the second shaft 40. In the preferred embodiment, a first portion and a second portion (40A, 40B) of the second shaft 40 will extend beyond the second pair of spaced apart sidewalls 37, and a knob 44 will be attached to each portion of the second shaft.

Reciprocal rotation of the lever 24 will cause co-rotational rotation of the first shaft 26 by virtue of a pair of ratchet wheels 60 which are mounted on the first shaft 26 between the first pair of sidewalls 36 and the second pair of spaced apart sidewalls 37. It is preferred that two ratchet wheels 60 be used, although one may possibly be used. Pawl 61 aides in the rotation of the first shaft 26 by operating on the ratchet wheel 60. The pawl 61 is spring loaded and slides in a pair of opposed slots 64 (FIG. 6) in the second pair of opposed sidewalls 37.

Second, or long, strap 50 is provided having second hook 54 provided at one end thereof. The free or non-active end of strap 50, so referred to because it has no connection to second hook 54, is first passed through first slot 32 and then inserted in second slot 42 (FIGS. 5 and 6). Second shaft 40 is then rotated, with the aid of knobs 44, to roll up free end of strap 50 into a roll 52.

In use second hook 54, and second strap 50, are completely unrolled and removed from second shaft 40. Second hook 54 is attached to the transportation vehicle on which the cargo is to be transported, at the appropriate location. The free end of the strap 50 is placed through first slot 32 in first shaft 26, and the lever 24 is reciprocally rotated, causing co-rotational movement of the first shaft 26. Since the first strap 50 is inserted in the first slot 32, and the connecting arm 22 is restrained by the first strap 25 and the first hook 27, the cargo tightener and strap collector 20 is tightened down on the cargo. At this point, the free end of the second strap 50 is inserted in the second slot 42 in the second shaft 40 and the knobs 44 are rotated to take up any slack in the strap before the cargo is transported.

Alternately, the free end of the second strap 50 may be left inserted in the second slot 42 in the second shaft 40, and the second strap 50 along with second hook 54 may be pulled out, causing the roll 52 to unwind until the second hook 54 may be attached to the transportation vehicle in the appropriate spot. The lever 24 is then reciprocally rotated causing co-rotational movement of the first shaft 26, and the tightening of the cargo tightener and strap collector 20 on the cargo (not shown) in the manner previously described. Any slack in the second strap 50 is taken up by rotating the knob or knobs 44 until the slack is removed.

In order to provide clearance for the roll 52 so that it does not strike the cargo being transported, the lever 24 is provided with a first, substantially linearly extending portion 70, and a second linearly extending portion 71 extending at an angle with respect to the first portion 70, thus elevating the roll 52 away from the cargo by elevating the second shaft 40 away from the cargo.

If it is desired to have the linearly and angularly extending portions 71 of the second pair of sidewalls 37 be further apart proximate the roll 52, a pair of diverging portions 72 of the second pair of sidewalls 37 may be interposed between the first linearly extending portion 70 and the second linearly and angularly extending portion 71 of each of said second pair of sidewalls 37.

Referring now to FIGS. 7-10, there is illustrated a modification of the present invention which locks the roll 52 positively in position on the arm or lever 24 of our cargo tightener and strap collector, now generally indicated by the numeral 55 for ease of understanding. This is accomplished by a modification to shaft 40 and knobs 44 described in regard to FIGS. 4-6. In this modification of the invention, threaded shaft 80 is used in place of the second shaft 40. Threaded shaft 80 may be hollow, or at least partially hollow, and may have internal or external threads for the purposes described below. In the preferred embodiment, threaded shaft 80 is hollow, and has an aperture, opening, or hollow portion 82. Aperture 82 may include first portion or first threaded portion 84, and second portion or second threaded portion 86, of threaded shaft 80. Threaded shaft 80 will still have slot 42 provided therein to receive ratchet tail 50A in the manner described above.

First threaded portion 84 and second threaded portion 86 of threaded shaft 80 may be of the same or different diameters, as desired. It is preferable that the apertures in the second pair of sidewalls 37 be slightly larger than the diameter of the adjacent threaded portions (84,86) of the threaded shaft 80 to accept a first threaded fastener 88 and a second threaded fastener 90. In the illustrated embodiment, the first threaded fastener 88 is of a smaller diameter than the second threaded fastener 90, so the first sidewall aperture 37A is of a smaller diameter that the second sidewall aperture 37B, and both are larger than their respective fasteners to allow free rotation of first threaded fastener 88 and a second threaded fastener 90 with respect to the associated aperture. First threaded fastener 88, which may be of any type well known in the art, is secured for non-rotation with respect to first rotatable knob 92 by any known means. In other words, when first rotatable knob 92 is rotated, first threaded fastener 88 rotates. First threaded fastener 88 is also fixed with regard to first threaded portion 84 of threaded shaft 80. Since first sidewall aperture 37A is larger than first threaded fastener 88, and first threaded fastener 88 is fixed with regard to first rotatable knob 92 and first threaded portion 84, when first rotatable knob 92 is rotated, threaded shaft 80 will rotate as long as second rotatable knob 94 is not tightened against a sidewall 37.

Figure 9:
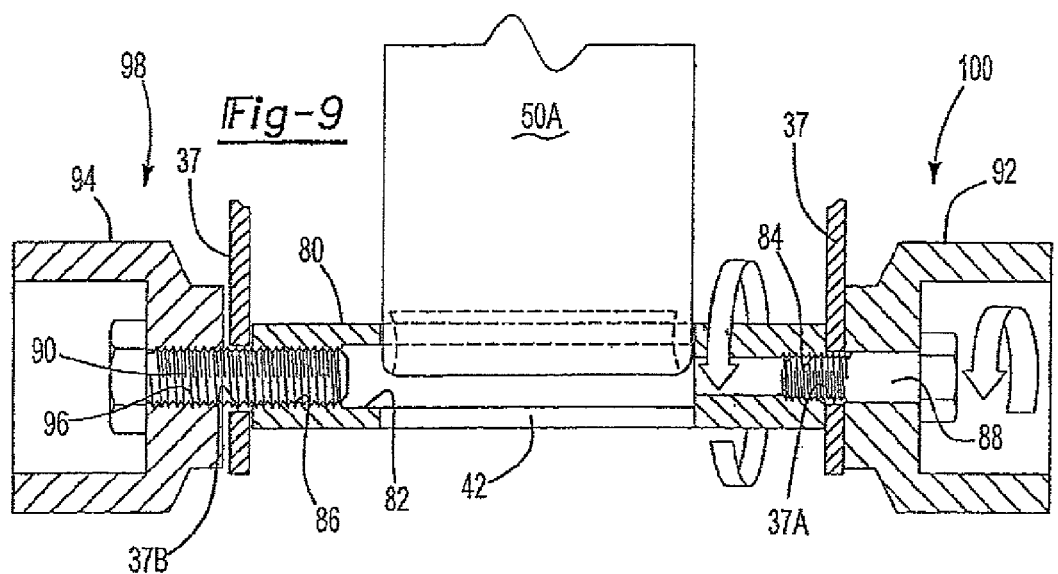
FIG. 9 is an enlarged view, partly in section, of the construction shown in FIG. 7, illustrating how the ratchet strap tail may be wound on the handle by turning the right hand knob, as long as the left hand knob has not been tightened.
Figure 10:
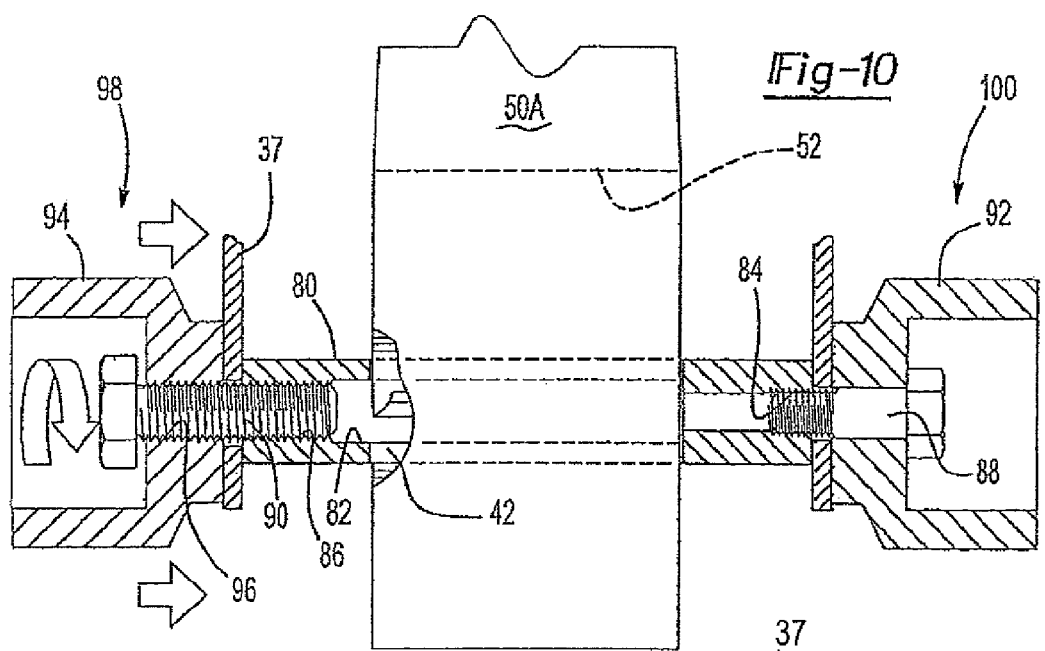
FIG. 10 is a view, similar in part to FIG. 9, illustrating how the right hand knob can not be turned further once the left hand knob is tightened against the sidewall, thus securing the ratchet tail in place during transport of a load.

Second threaded fastener 90 is also fixed with regard to its' respective threaded portion (second threaded portion 86) of aperture 82. However, second rotatable knob 94 is not fixed with respect second threaded fastener 90 but, instead, is able to rotate with respect thereto because second rotatable knob 94 has a threaded aperture 96 with threads complementary to those found on second threaded fastener 90. Thus, rotation of second rotatable knob 94 will move it toward and away from respective sidewall 37. In operation, second rotatable knob 94 is positioned in its loosened position, as shown in FIG. 9. Ratchet tail 50A is inserted in slot 42, and first rotatable knob 92 is rotated, which rotates threaded shaft 80, which causes ratchet tail 50A to be wound on threaded shaft 80 until it is wound up to form roll 52. At this point, second rotatable knob 94 is rotated until it is tight against sidewall 37, and sidewall 37 is tight against hollow shaft 80, thus preventing any further rotation of the threaded shaft 80 by the first rotatable knob 92. Since the free end of strap 50 (ratchet tail 50A) was inserted into slot 42, and the remainder of strap 50 was wound on top of ratchet tail 50A before second rotatable knob 94 was tightened, there is no loose portion of the strap 50 to come undone and cause the dangers posed by the prior art cargo tighteners.

Figure 7:
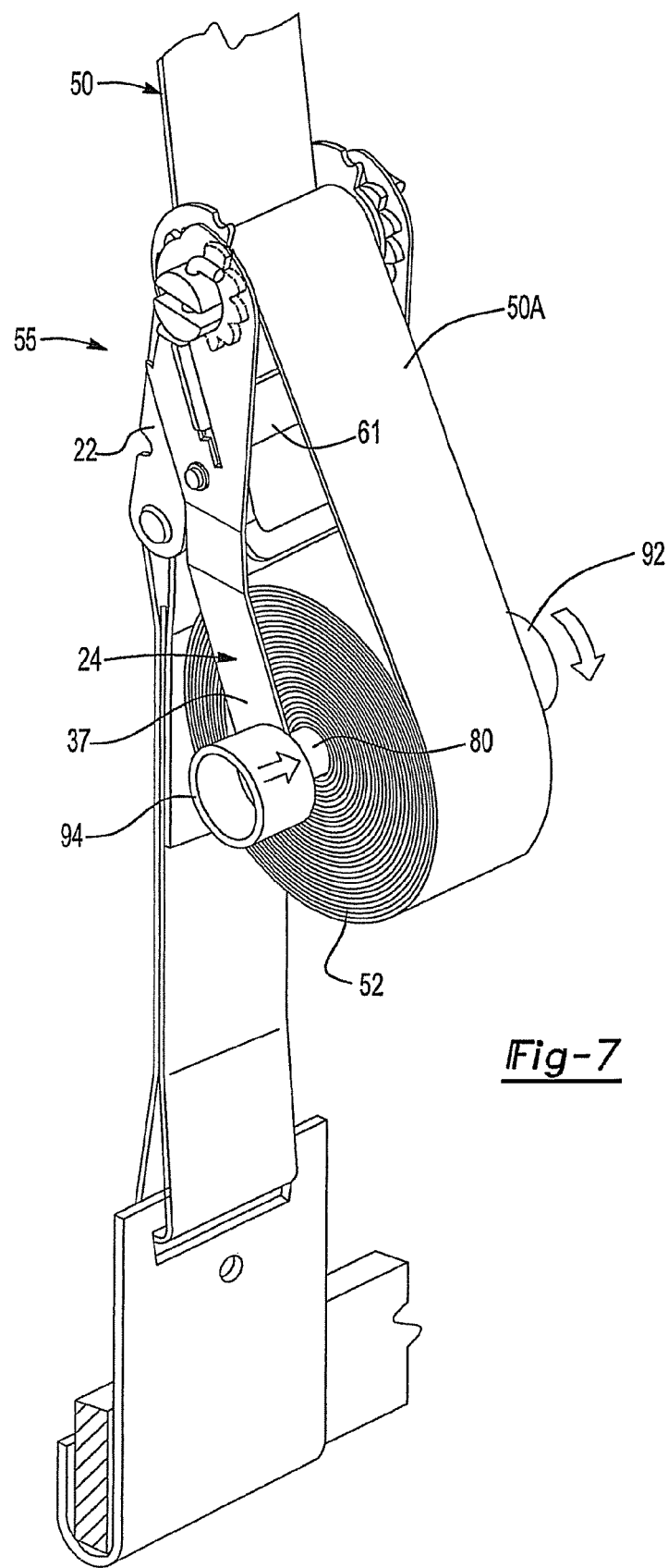
FIG. 7 is a perspective view of a modification of the present invention.
Figure 8:
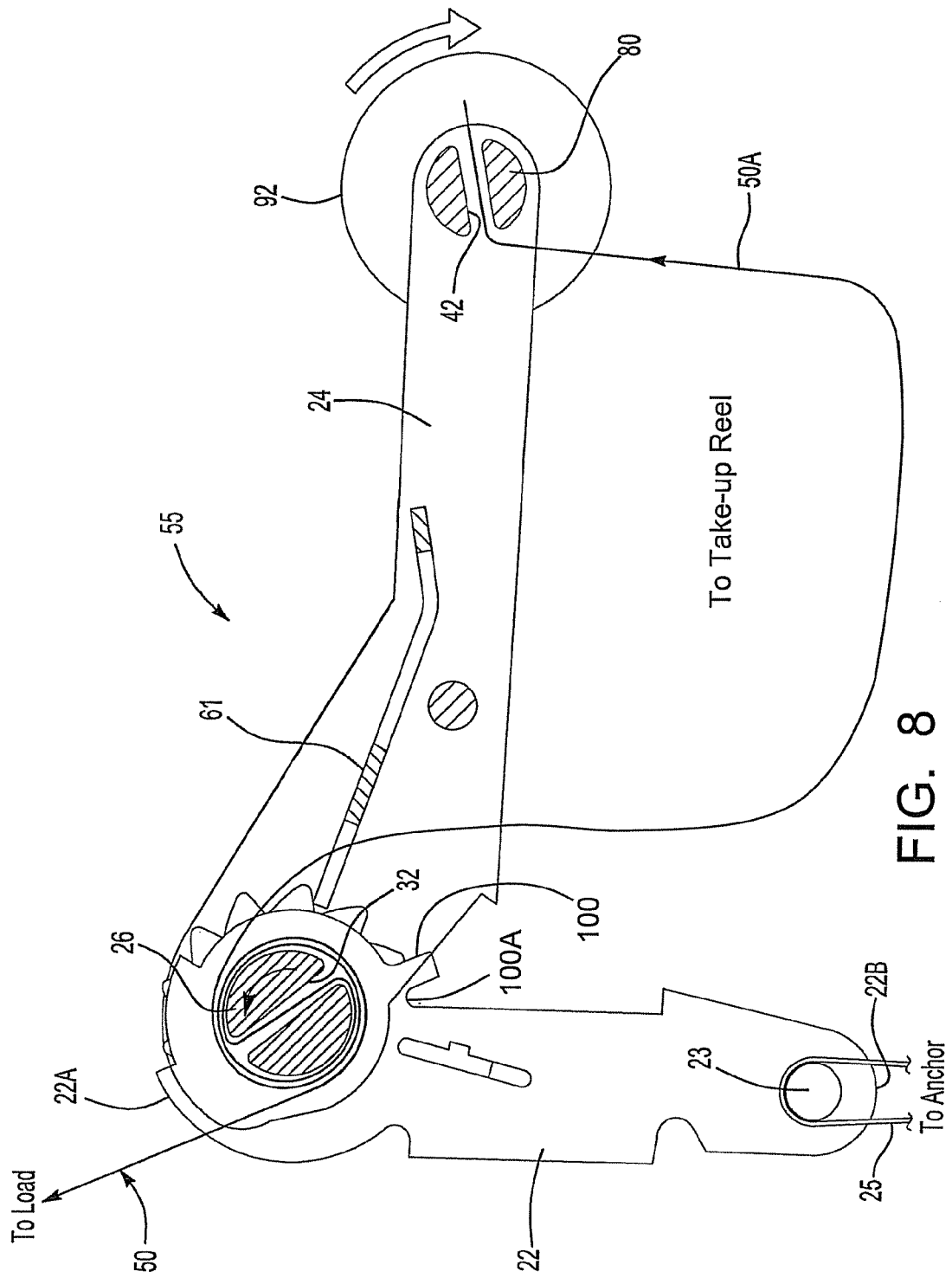
FIG. 8 is a diagrammatic cross-sectional view of the construction shown in FIG. 7 illustrating how the ratchet strap is fed through the device.
Figure 12:
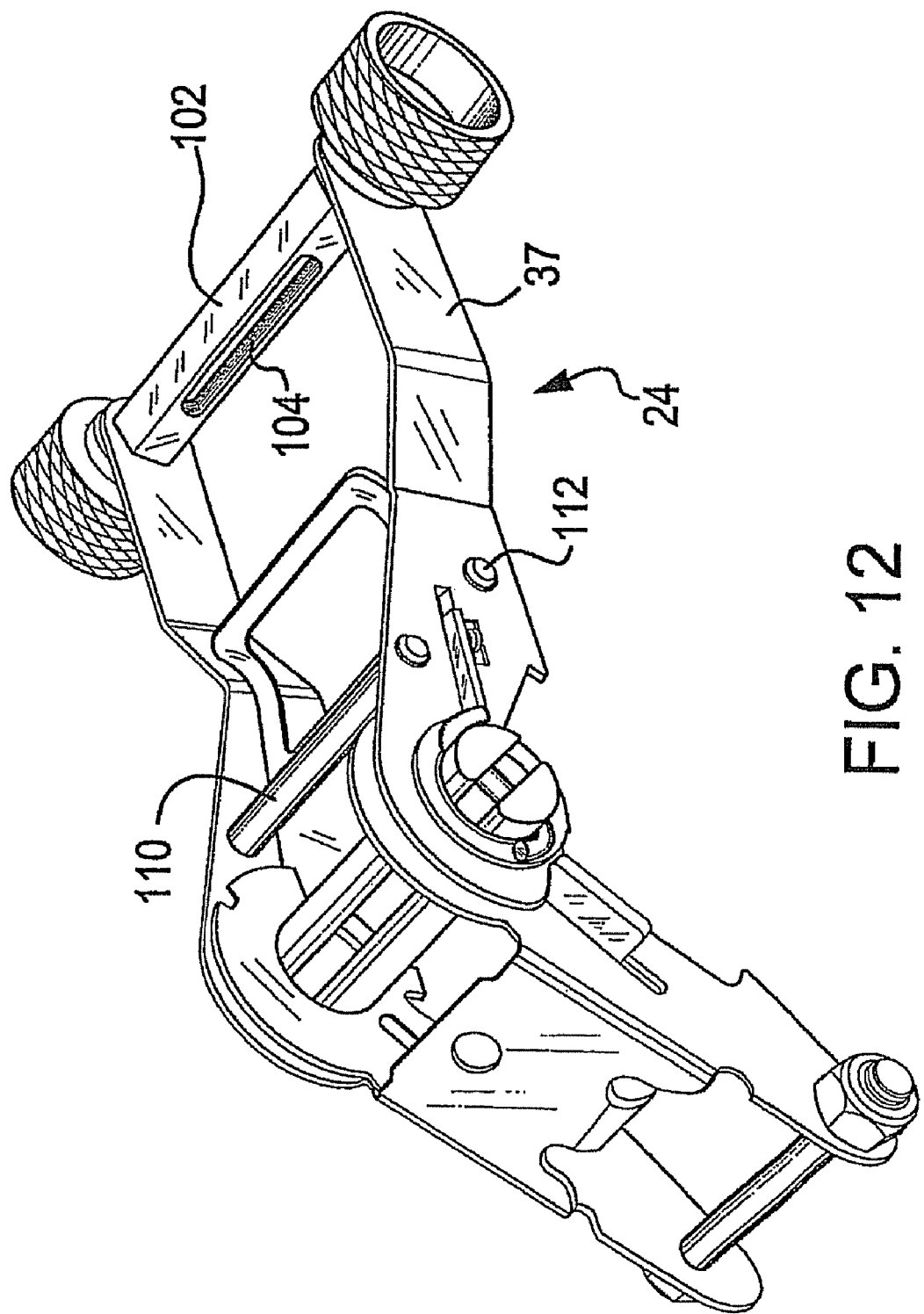
FIG. 12 is a perspective view of an alternate embodiment of the invention, with the ratchet straps removed for clarity.

Referring now to FIGS. 6, 7 and 12, to complete the operation of having the cargo fastened and ready to travel, the cargo tightener and strap collector 20 must be placed in the position shown in FIG. 6, which is the closed position with the roll 52 Placed proximate the connecting arm 22. In order to do this, lever 24 is reciprocated until the strap 50A is tight and lever 24 will not move any further. At this point the pawl 61 is pulled back, against spring tension, and the lever 24 can be rotated until it hits the stop 100, and preferably, snaps into recess 100A.

Figure 11:
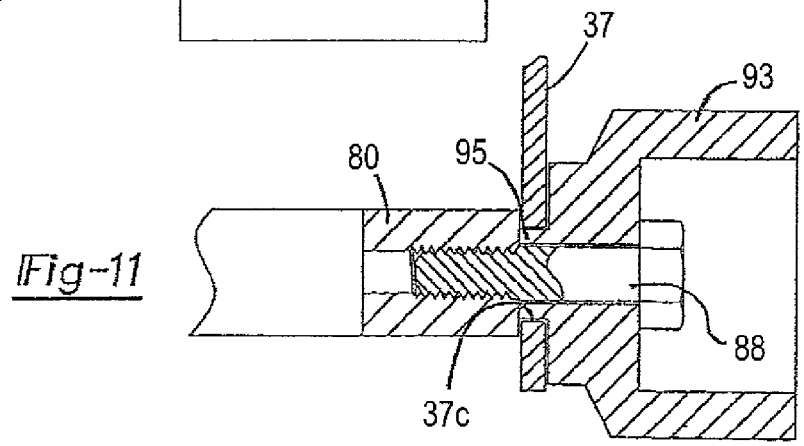
FIG. 11 is an enlarged view, partially in section, of an alternate embodiment of the right hand knob.

FIG. 11 illustrates an alternate embodiment of the invention in which the first rotatable knob 93 is provided with an annular shoulder 95 that fits within an enlarged first sidewall aperture 37C. The first sidewall aperture 37C is larger than the outer diameter of the annular shoulder 95 of the knob 93, so that the knob 93, along with the first threaded fastener 88 and threaded shaft 80 which rotate therewith, freely and smoothly rotates relative to the sidewall 37.

In the alternate embodiment of the invention shown in FIGS. 12 and 13, the second shaft 102 is formed with a non-circular cross section, preferably the hexagonal cross section shown in FIG. 12. The second shaft 102 has provided therein second slot 104 to accept a free end, i.e., the end without the second hook 54, of a second belt 50, as described above.

The shaft 102 is mounted in opposed apertures provided in the spaced apart sidewalls 37 in the lever 24. As shown in FIG. 13, the left hand sidewall 37, proximate the second knob 94, is provided with an aperture 106 to receive the bolt 90, with a non-circular recess 108 formed about the aperture 106 that is of a shape that is complementary with the shape of the associated end of the shaft 102. As shown, the recess 108 is hexagonal in shape and is slightly larger than the hexagonal end of the shaft 102. With this construction, when the second rotatable knob 94 is tightened against the sidewall 37, the end of the shaft 102 is drawn in to the complementary recess 108 in the sidewall 37, providing a positive mechanical stop preventing relative rotation between the shaft 102 and sidewall 37.

Any shape of non-circular recess is well within the scope of the present invention. For example, FIG. 15 shows a square recess 130. In this embodiment of the invention, shaft 102 would have at least an end having a square cross-section, and be slightly smaller than the square recess 130. It may be preferred for manufacturing or cost considerations to have the entire shaft 102 of a square cross-section.

The non-circular recess 108 may be symmetrical or non-symmetrical with respect to the aperture 106, as long as the end of the shaft 102, at least proximate the end which will mate with the non-circular recess 108, is of a complementary cross-section.

In another embodiment of the invention, the end of the shaft 102 may be of a shape that will interfere with the shape of the non-circular recess 108. For example, the shaft 102 may have a square cross-section, and the non-circular recess may be of a triangular shape. If the dimensions are chosen correctly, which is well within the skill of the art, the square shaft may fit in the triangular recess, but won't be able to rotate therein.

In addition, in the embodiment illustrated in FIGS. 12 and 13, a pair of support pins 110, 112 are shown firmly secured between the first substantially linearly extending portions 70 of the lever 24. The pins 110, 112 provide further structural stability to the lever, especially during winding and unwinding of the strap, by preventing any twisting or binding of the lever.

An alternate embodiment of the left hand or second rotatable knob is shown at 114 in FIG. 14. The second rotatable knob 114 is not fixed with respect to a second threaded fastener 116 but, instead, is able to rotate with respect thereto because second rotatable knob 114 has a threaded aperture 118 with threads complementary to those found on second threaded fastener 116, so that rotation of second rotatable knob 114 will move it toward and away from respective sidewall. Further, the second rotatable knob 114 is provided with an angled portion 120 extending at least some portion between the threaded aperture 118 and an inner cylindrical wall 122 of the knob 114. The threaded fastener may then be provided with a chamfered or angled bottom surface 124 on the head 126 of the fastener 116. Preferably, the angle on the surface 124 is different from that on the portion 120, so that when the threaded fastener 116 is seated within the knob 114, there is a reduced area of contact between the surface 124 and portion 120. Such a construction may enhance the ease of rotation of the threaded fastener 116.

The scope of the present invention is not limited to the use of threaded fasteners and knobs, as any rotation mechanism by which the threaded shaft 80 can be rotated, and then selectively be prevented from rotation, is well within the scope of the present invention. Many rotation mechanisms and/or rotation means are known in the art which are suitable for use in the present invention.

For example, the threaded shaft 80 journaled for rotation between the second pair of spaced apart sidewalls 37 of the lever 24 may have a first threaded portion 84 to accept a first rotation mechanism 98, and a second threaded portion 86 to accept a second rotation mechanism 100. The first means of rotation 98 is operable to rotate the threaded shaft 80, and the second means of rotation 100 is operable to restrain or permit rotation of the threaded shaft 80. The use of any motion transfer means whereby rotary motion is transformed into axial motion is well within the skill of the art.

Figure 16:
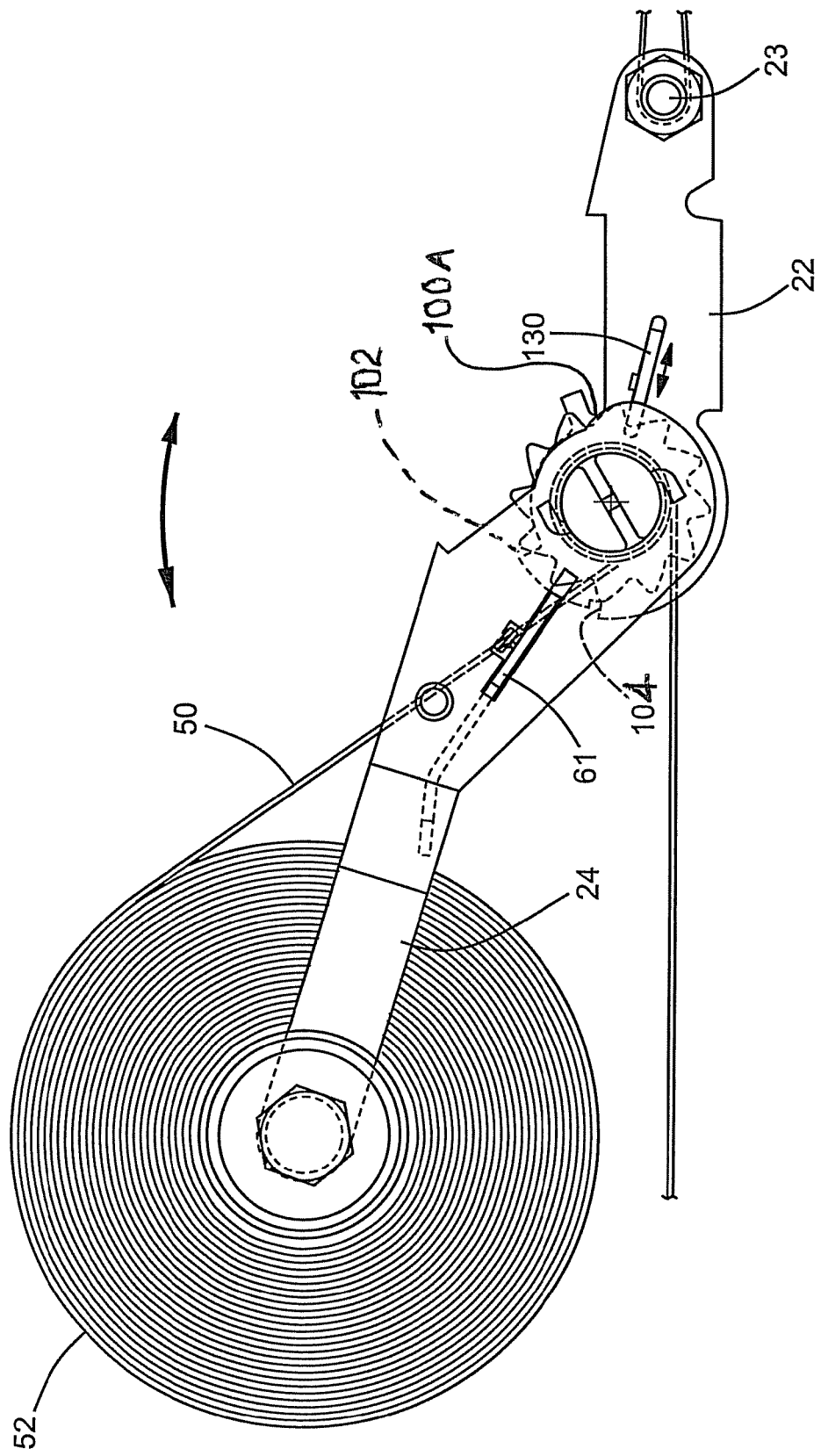
FIG. 16 is an elevational view of an embodiment of our invention showing how the pawl 61, and the second pawl 130, must both be disengaged before the shaft 26 may rotate, and the strap 50 may be removed.
Figure 17:
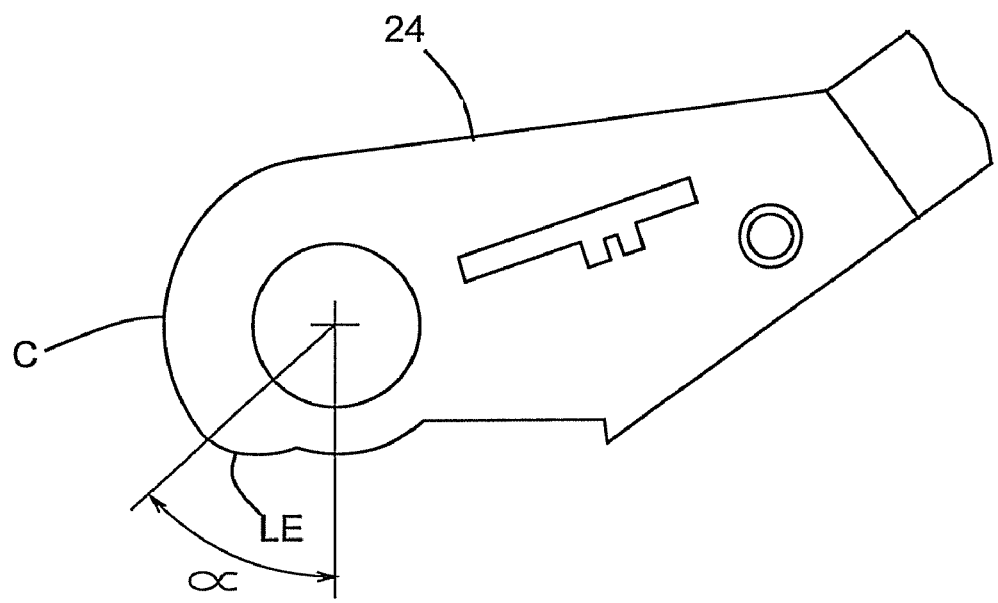
FIG. 17 is an elevational view, partially broken away, of the improved cam of the present invention.
Figure 18:
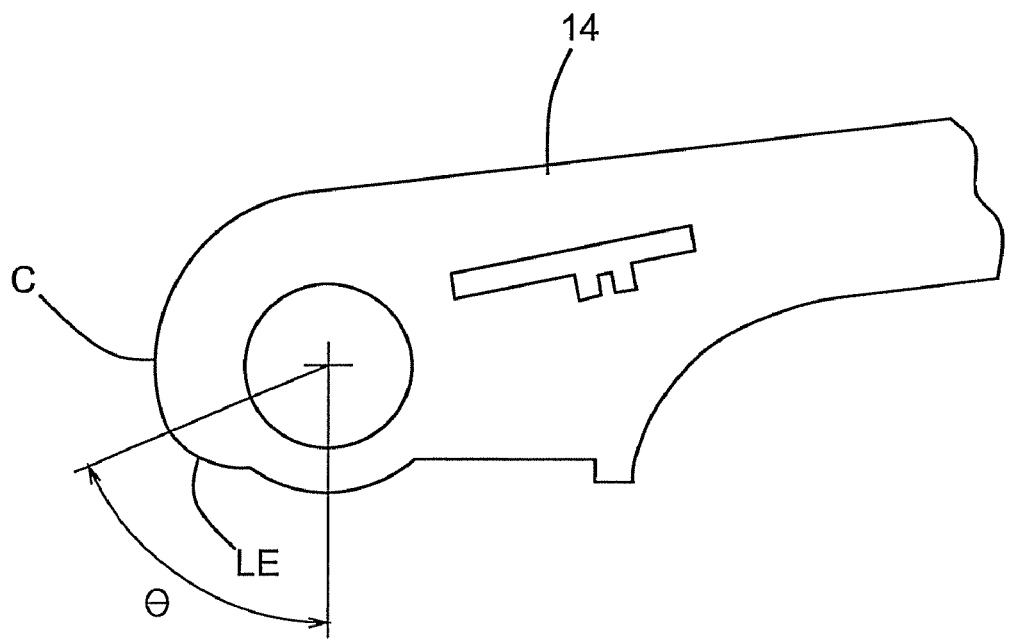
FIG. 18 is an elevational view, partially broken away, of a prior art cam surface.

Referring now to FIGS. 16-18 it can be seen how, at the end of the journey for load L, the cargo tightener and strap collector is removed from the load. The operation is similar to that used in prior art devices. First, it is again necessary to pull back on pawl 61 to release it from recess 100A so it can turn. The lever will turn until stop 102 is reached. However, at this time the shaft 40 is not released, and the strap 50 can not be removed.

At this point, first pawl 61 must be again pulled back, this time a distance to clear stop 102, and permit further movement of the lever, preferably until first pawl 61 lodges in second recess 104. This further movement of the lever 24 has caused cam C to rotate and push the second pawl 130 rearward to release shaft 40.

It was found that the roll 52 would sometimes hit the strap 50 or the load L before the lever 24 would present the cam C, and more particularly the cam lobe LE, to the second pawl 130 and push it back, thereby releasing the second shaft 40 so the strap could be removed from the slot 42. This was found to usually happen when the roll 52 of strap 50 was rather large, a situation that the shape of the lever promotes. The problem turned out to be the use of the prior art cam angle θ as shown in FIG. 18. Angle θ (the angle from the vertical where the cam reaches maximum height) in the prior art devices was in the range of 97°-99° However, the use of this angle just did not permit the second pawl 130 to be released when necessary.

It was found out that a smaller angle was necessary. Though the exact angle may depend on the application, as shown in FIG. 17, an angle α in the range of 60°-70° degrees, and most preferably in the range of 64°-66°, produces satisfactory operation, regardless of the size of the roll 52.

Thus, by carefully considering the problems in the prior art devices, we have provided a novel cargo tightener and strap collector which is simpler in construction, easier to manufacture and less costly than prior art devices.

What is claimed is:

1. An apparatus for tightening and collecting a strap, comprising:
    a) a cargo tightening portion comprising:
        i) a connecting arm extending in a longitudinal direction, the connecting arm having a first pair of spaced apart sidewalls;
        ii) a lever pivotally mounted in the connecting arm by a first shaft, the first shaft having a first slot for introducing the end of a strap, the first shaft being operable for co-rotational movement with the lever for tightening the strap, and the lever having a second pair of spaced apart sidewalls exterior to the pair of spaced apart sidewalls of the connecting arm; and
    b) a strap collector portion comprising a threaded shaft mounted for rotation between the second pair of spaced apart sidewalls of the lever, the threaded shaft having a slot therein to accept the end of the strap after the strap is tightened on the cargo, a first rotatable knob operable to rotate the threaded shaft, and a second rotatable knob operable to selectively secure the threaded shaft from further rotation;
c) at least one toothed ratchet wheel fixedly mounted to the first shaft; and
d) a pawl mounted to the lever for reciprocal movement to engage and disengage from the at least one toothed ratchet wheel and cause the rotation of the first shaft.

2. The apparatus for tightening and collecting a strap defined in claim 1, wherein the lever has a cam portion pivotally mounted in the connecting arm by the first shaft, and a second pawl mounted on the connecting arm and being reciprocally operated by the cam portion.

3. The apparatus for tightening and collecting a strap defined in claim 1, wherein the lever is longer than the connecting arm.

4. The apparatus for tightening and collecting a strap defined in claim 1, wherein each one of the second pair of sidewalls of the lever comprises a straight portion and a portion extending at an angle to the straight portion.

5. The apparatus for tightening and collecting a strap defined in claim 1, wherein at least one of the second pair of sidewalls has a non-circular recess provided therein, and the threaded shaft has at least one end of a complimentary shape to the non-circular recess to engage or mate with the recess when the first and/or the second rotation means are tightened.

6. The combination cargo tightener and strap collector defined in claim 5, wherein the non-circular recess is square.

7. The combination cargo tightener and strap collector defined in claim 6, wherein the threaded shaft has a square cross-section.

8. The combination cargo tightener and strap collector defined in claim 5, wherein the non-circular recess is hexagonal.

9. A combination cargo tightener and strap collector comprising:
a) connecting arm extending in a longitudinal direction, the connecting arm having a first pair of spaced apart sidewalls;
b) a lever pivotally mounted to the connecting arm by a first shaft, the first shaft having a first slot for introducing the end of a strap, the first shaft being operable for co-rotational movement with the lever for tightening the strap, the lever having a second pair of spaced apart sidewalls exterior to the pair of spaced apart sidewalls of the connecting arm; and
c) a threaded shaft mounted for rotation between the second pair of spaced apart sidewalls of the lever, the threaded shaft comprising:
i) a second slot therein to accept the end of the strap after the strap is tightened on the cargo;
ii) a first threaded portion provided at one end thereof;
iii) a second threaded portion provided at the other end thereof;
iv) a first rotation mechanism cooperating with the first threaded portion to rotate the threaded shaft, thereby causing the strap to be wound on the second shaft; and
v) a second rotation mechanism cooperating with the second threaded portion to restrain or stop rotation of the second shaft;
d) at least one toothed ratchet wheel fixedly mounted to the first shaft; and
e) a pawl mounted to the lever for reciprocal movement to engage and disengage from the at least one toothed ratchet wheel and cause the rotation of the first shaft.

10. The combination cargo tightener and strap collector defined in claim 9, wherein the second threaded portion of the threaded shaft comprises:
a) a second internal thread axially aligned with the threaded shaft; and
b) a second threaded fastener fixedly restrained in the second internal thread.

11. A combination cargo tightener and strap collector comprising:
a) a connecting arm extending in a longitudinal direction, the connecting arm having a pair of spaced apart sidewalls;
b) a lever pivotally mounted to the connecting arm by a first shaft, the first shaft having a first slot for introducing the end of a strap, the first shaft being operable for co-rotational movement with the lever for tightening the strap, the lever having a second pair of spaced apart sidewalls; and
c) a threaded shaft mounted for rotation between the second pair of spaced apart sidewalls of the lever, the threaded shaft comprising:
i) a second slot therein to accept the end of the strap after the strap is tightened on the cargo;
ii) a first threaded portion provided at one end thereof;
iii) a second threaded portion provided at the other end thereof;
iv) a first rotation mechanism cooperating with the first threaded portion to rotate the threaded shaft, thereby causing the strap to be wound on the second shaft; and
v) a second rotation mechanism cooperating with the second threaded portion to restrain or stop rotation of the second shaft,
wherein the first threaded portion of the threaded shaft comprises:
a) a first internal thread axially aligned with the threaded shaft; and
b) a first threaded fastener fixedly restrained in the first internal thread.

12. The combination cargo tightener and strap collector defined in claim 11, wherein the first rotation mechanism comprises a first rotatable knob fixedly connected to the first threaded fastener to rotate the threaded shaft when the first rotatable knob is rotated.

13. The combination cargo tightener and strap collector defined in claim 11, wherein the second rotation mechanism comprises a second rotatable knob rotatably mounted to the second threaded fastener for reciprocal lateral movement along the axis of the second threaded fastener.

14. The combination cargo tightener and strap collector defined in claim 11, wherein the first rotation mechanism comprises a first rotatable knob having an annular shoulder which fits in an enlarged first sidewall aperture and contacts the threaded shaft.

* * * * *